United States Patent
Caccialupi et al.

(10) Patent No.: US 8,082,941 B2
(45) Date of Patent: Dec. 27, 2011

(54) REVERSE ACTION FLOW ACTIVATED SHUT-OFF VALVE

(75) Inventors: Alessandro O. Caccialupi, Houston, TX (US); Andrei G. Filippov, Houston, TX (US)

(73) Assignee: Mohawk Energy Ltd., Houston, TX (US)

( * ) Notice: Subject to any disclaimer, the term of this patent is extended or adjusted under 35 U.S.C. 154(b) by 575 days.

(21) Appl. No.: 12/252,524

(22) Filed: Oct. 16, 2008

(65) Prior Publication Data

US 2009/0255592 A1 Oct. 15, 2009

Related U.S. Application Data

(60) Provisional application No. 61/063,968, filed on Feb. 7, 2008.

(51) Int. Cl.
*F16K 17/14* (2006.01)
*F16K 17/40* (2006.01)

(52) U.S. Cl. ............................ 137/71; 137/523; 166/317
(58) Field of Classification Search .................... 137/70, 137/71, 522, 523; 166/317
See application file for complete search history.

(56) References Cited

U.S. PATENT DOCUMENTS

| | | | | |
|---|---|---|---|---|
| 3,016,015 A * | 1/1962 | Filstrup | ......................... | 102/330 |
| 3,872,884 A * | 3/1975 | Busdiecker et al. | .......... | 137/498 |
| 4,082,104 A * | 4/1978 | Keeney | ............................ | 137/71 |
| 4,519,457 A * | 5/1985 | Holland et al. | ................ | 166/317 |
| 4,574,894 A * | 3/1986 | Jadwin | ............................ | 175/317 |
| 6,341,616 B1 * | 1/2002 | Taylor | ......................... | 137/68.12 |
| 6,349,771 B1 | 2/2002 | Luke | | |
| 6,640,824 B2 * | 11/2003 | Majkovic | ......................... | 137/71 |

* cited by examiner

*Primary Examiner* — John Fristoe, Jr.
(74) *Attorney, Agent, or Firm* — Tumey L.L.P.

(57) ABSTRACT

A flow activated valve includes an outer body and a piston disposed in an inner cavity of the outer body. The flow activated valve also includes one or more fluid passage exits in the outer body and one or more piston fluid passages in the piston. The one or more fluid passage exits and the one or more piston fluid passages allow fluid flow out of the valve. The flow activated valve also includes a flow restriction member disposed in a piston inner cavity. In addition, the flow activated valve includes a shear member disposed in the outer body, and a bias member disposed in an inner cavity of the outer body. The flow activated valve further includes a position control member disposed in the piston and a sealing member.

13 Claims, 2 Drawing Sheets

REVERSE ACTION FLOW ACTIVATED SHUT-OFF VALVE

CROSS-REFERENCE TO RELATED APPLICATIONS

This application is a non-provisional of U.S. Application Ser. No. 61/063,968 filed on Feb. 7, 2008, which is incorporated by reference herein in its entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of oil field tools. More specifically, the invention relates to a flow activated valve that allows its closure without pressure surge.

2. Background of the Invention

Oil field wells are typically drilled using a conduit, such as drill pipe or coiled tubing, attached to a certain tool designed for a particular operation. During deployment of the tool in the well, drilling fluid flows through the conduit and the tool to wash debris through an annulus formed between the conduit and a wall of the wellbore to the surface. This operation typically involves high rates of fluid flow.

After the tool has been deployed to a desired location, the fluid passage of the tool is closed, and the drilling fluid pressure is raised to a sufficient level to operate the tool. Typically, a sealing member, such as a dart or a ball, is pumped through the conduit into the tool to provide a seal to close the fluid passage. However, the passage diameter of the conduit usually is significantly larger than the passage diameter of the tool, which makes use of a dart or a ball for tool fluid passage closure unreliable or impossible.

Another type of sealing member is a flow activated shut off valve. This type of valve allows a certain flow rate of drilling fluids to pass through the tool during tool deployment when the valve is open. To close the valve, the flow rate is increased to a higher level so that backpressure develops and urges the valve into a closed position. A problem with existing flow actuated shut off valves is that the valve closure is almost instantaneous, which may result in a high pressure surge, or, so called water hammer effect, that may damage tool components or cause the conduit, such as coiled tubing, to burst.

Thus, there is a need for a reliable sealing member that allows a high circulation flow rate through the tool during deployment and provides closure of the fluid passage of the tool without causing a pressure surge.

BRIEF SUMMARY OF SOME OF THE PREFERRED EMBODIMENTS

These and other needs in the art are addressed in one embodiment by a flow activated valve. The flow activated valve includes an outer body and a piston disposed in an inner cavity of the outer body. The flow activated valve also includes one or more fluid passage exits in the outer body and one or more piston fluid passages in the piston. The one or more fluid passage exits and the one or more piston fluid passages allow fluid flow out of the valve. The flow activated valve also includes a flow restriction member disposed in a piston inner cavity. In addition, the flow activated valve includes a shear member disposed in the outer body, and a bias member disposed in an inner cavity of the outer body. The flow activated valve further includes a position control member disposed in the piston and a sealing member.

These and other needs in the art are addressed in another embodiment by a method of closing a downhole valve. The method includes flowing operational fluid through a valve at a first flow rate with the valve having an outer body. The valve further includes one or more fluid passage exits in the outer body, and a piston disposed inside the outer body. The valve further includes one or more piston fluid passages in the piston. In addition, the valve includes a flow restriction member disposed in a piston inner cavity, and a shear member disposed in a lower portion of the outer body. Moreover, the valve includes a bias member disposed in an inner cavity of the lower portion. The valve additionally includes a position control member disposed in the piston and a sealing member. The method also includes flowing the operational fluid through the valve at a higher second flow rate. In addition, the method includes reducing the flow rate of the operational fluid to about zero and closing the valve.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
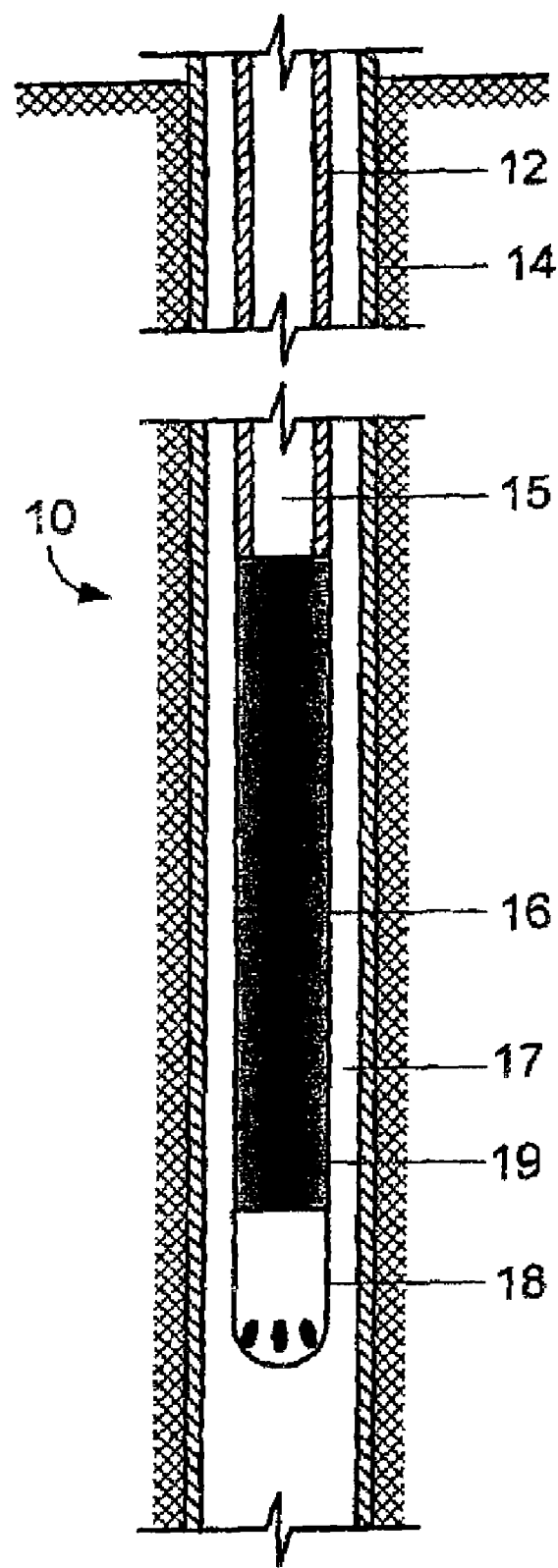
FIG. 1 is a schematic cross sectional view of a valve attached to a tool in a wellbore.

FIG. 1 is a schematic cross sectional view of an embodiment of valve 18 attached to the lower end 19 of a tool 16 and deployed on a conduit 12 in a wellbore 10 that is shown in a vertical orientation. It is to be understood that wellbore 10 is not limited to a vertical orientation but may include other orientations such as lateral or inclined orientations. Casing 14 lines wellbore 10. In alternative embodiments (not illustrated), valve 18 is attached to lower end 19 of tool 16 deployed in an open hole wellbore 10. Conduit 12 provides a fluid passage 15 to tool 16. Conduit 12 includes any device suitable for providing fluid passage 15. Without limitation, conduit 12 includes drill string, coiled tubing, or the like. As shown, an annulus 17 is disposed between casing 14 and tool 16.

Figure 2A:
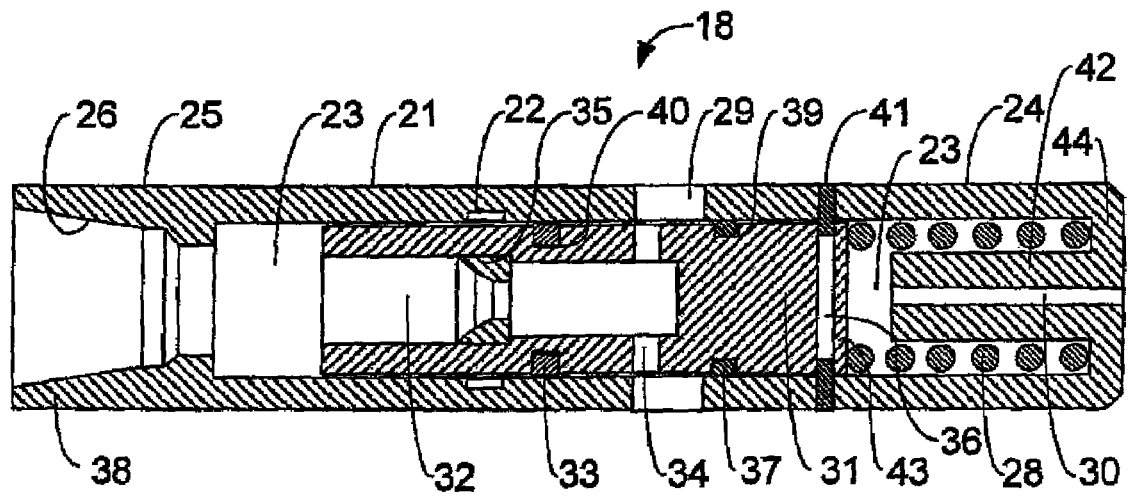
FIG. 2A is a schematic longitudinal cross sectional view of a valve with a piston in the outer body of the valve in a first position.

FIG. 2A illustrates a schematic longitudinal cross-sectional view of one embodiment of valve 18 in an open position (first position). In an embodiment as shown, valve 18 includes an outer body 21 having an upper portion 25 and a lower portion 24. Upper and lower portions 25, 24 are joined together by a threaded joint (not shown), and a piston 31 slidably disposed in an inner cavity 23 formed inside the outer body 21. Upper portion 25 includes one end 38 with threads 26 to mate with the corresponding ends of tool 16. Lower portion 24 includes a support flange 42 with flange fluid passage 30, which allows fluid flow in and out from inner cavity 23. Outer body 21 also includes one or more fluid passage exits 29 to allow fluid flow out from inner cavity 23. In an embodiment, piston 31 is a cylindrical member having a piston inner cavity 32 and one or more piston fluid passages 34 to allow fluid flow from piston inner cavity 32 to fluid passage exits 29. It is to be understood that piston 31 is not limited to the embodiment illustrated in FIG. 2A but instead may include other embodiments having configurations suitable for slidable disposition in inner cavity 23.

As shown in FIG. 2A, a flow restriction member 35 is disposed inside piston inner cavity 32. Flow restriction member 35 may be a nozzle, an orifice, or any other flow restriction member that may be sized to provide a certain force at a given flow rate.

As further shown in FIG. 2A, a shear member 41 is disposed in lower portion 24 and engaged in groove 36. Shear member 41 may be a set screw, a shear pin, a shear ring, or other shear member capable of controlling the position of piston 31 relative to the outer body 21 in the longitudinal direction. In an embodiment, the shear member 41 is designed to allow for release of piston 31 at a certain selected force applied to piston 31 in the longitudinal direction and then to allow unconstrained movement of piston 31 inside outer body 21. The combination of the size of flow restriction member 35 and the size of shear member 41 may be selected to allow release of piston 31 relative to outer body 21 at a selected flow rate of operational fluid.

In addition, as shown in FIG. 2A, a bias member 28 is disposed in inner cavity 23 of outer body 21. In an embodiment, bias member 28 is disposed in inner cavity 23 of lower portion 24. Bias member 28 may be a spring (i.e., such as a coil spring), an elastomeric member, a solenoid operated piston, or other member capable of applying a longitudinal force to piston 31. Bias member 28 engages piston 31 on one end 43 and the outer body 21 on the other end 44. In some embodiments, bias member 28 engages the lower portion 24 on the other end 44. In an embodiment, bias member 28 is adapted to bias piston 31 in an upward position.

As shown in FIG. 2A, a position control member 33 is disposed in groove 40. Position control member 33 may be a C-ring, a collet, or other position control member capable of locking piston 31 in outer body 21 thereby preventing longitudinal movement of piston 31 relative to outer body 21. When piston 31 is urged into the closed position (i.e., the third position illustrated in FIG. 2C), position control member 33 engages valve body groove 22 and permanently locks piston 31 against outer body 21. In an embodiment, position control member 33 is adapted to lock piston 31 in a position preventing longitudinal movement of piston 31 in outer body 21.

FIG. 2A also illustrates a sealing member 37 disposed in a sealing groove 39 located adjacent to piston fluid passages 34. Sealing member 37 may be an elastomeric O-ring or any other hydraulic piston seal capable of providing a hydraulic seal between piston 31 and outer body 21.

During tool 16 deployment as illustrated in FIGS. 1 and 2A, valve 18 is in the first open position as shown in the embodiment of FIG. 2A and operational fluid is pumped through valve 18 at a selected circulation flow rate. For illustrative purposes, the selected circulation flow rate is referred to as the first flow rate. The operational fluid passes through flow restriction member 35, piston fluid passage 34, and fluid passage exit 29 out into the wellbore 10 to wash debris away from valve 18 and into annulus 17. The fluid flow creates a pressure drop through the flow restriction member 35, which results in a force urging the piston 31 toward lower portion 24. The shear member 41 exerts a counterforce that maintains the piston 31 in the first position maintaining alignment of piston fluid passages 34 and fluid passage exits 29, thereby allowing flow of the fluid out of the valve 18. In an embodiment, size of flow restriction member 35 and size of shear member 41 are selected to maintain piston 31 in a first position with one or more piston fluid passages 34 and one or more fluid passage exits 29 aligned at flow rates below or about equal to the first flow rate.

Figure 2B:
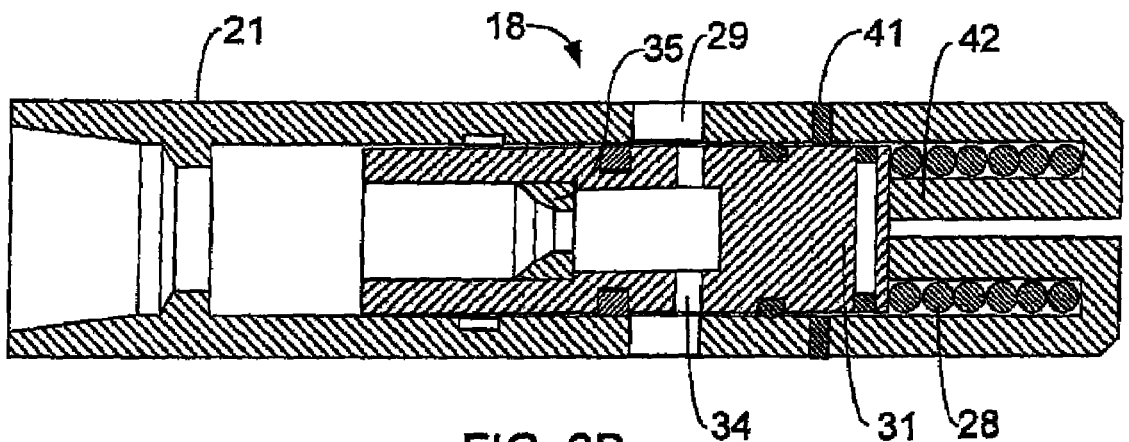
FIG. 2B is a schematic longitudinal cross sectional view of a valve with a piston in the outer body of the valve in a second position.
Figure 2C:
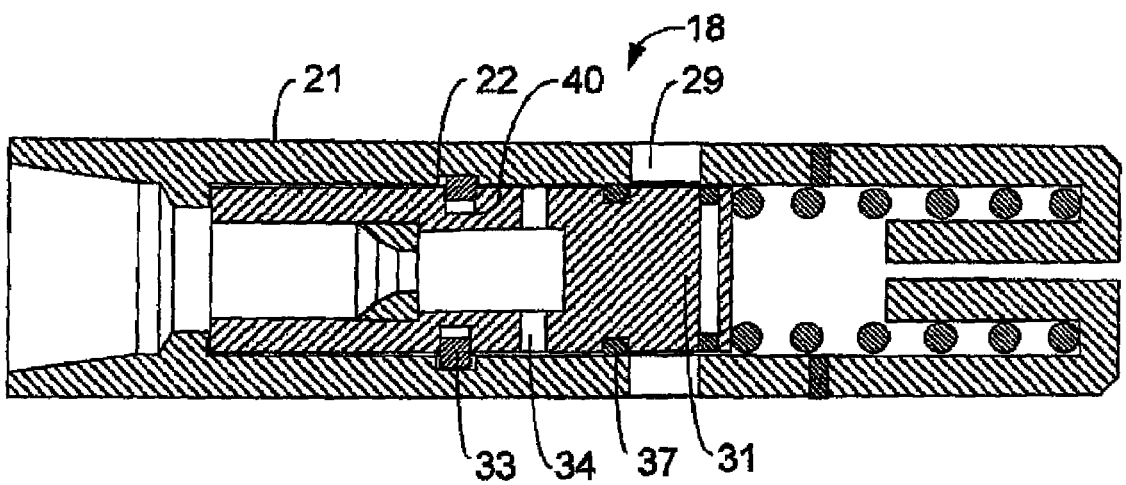
FIG. 2C is a schematic longitudinal cross sectional view of a valve with a piston in the valve body in a third position.

In an embodiment as illustrated in FIG. 2A, after the tool 16 has been deployed to the desired location, the fluid flow rate is increased to a second flow rate. The second flow rate develops increased pressure drop in the flow restriction member 35, which results in a force sufficient to shear the shear member 41 thereby releasing the piston 31 and allowing its longitudinal movement inside the outer body 21. As shown in FIG. 2B, the piston 31 moves toward the support flange 42 into the second position, thereby compressing the bias member 28. In the second position of the piston 31, piston fluid passage 34 and fluid passage exit 29 remain aligned, allowing fluid flow through the valve 18, and, therefore, the valve 18 remains open at a second flow rate. To close the valve 18, the fluid flow rate is gradually decreased to about zero or near zero allowing the bias member 28 to move the piston 31 backwards to the third position, as illustrated in FIG. 2C. In an embodiment, flow restriction member 35, shear member 41, and bias member 28 are selected such that at a flow rate equal to about the second flow rate, shear member 41 releases piston 31 and piston 31 moves longitudinally inside outer body 21 to a second position with one or more piston fluid passages 34 and one or more fluid passage exits 29 aligned in the second position.

In the embodiment as illustrated in FIG. 2C, when the piston 31 reaches the third position, the position control member 33 engages the valve body groove 22 thereby locking the piston 31 relative to the outer body 21 and preventing longitudinal movement of the piston 31 in the outer body 21. The position control member 33 is designed to sustain force greater than the force generated by pressure sufficient for operation of the tool 16. In the third position, sealing member 37 is located between fluid passage exit 29 in outer body 21 and the piston fluid passage 34 in piston 31 thereby preventing fluid flow through the valve 18. The valve 18 is permanently closed and hydraulically sealed.

In an embodiment, the bias member 28 is selected to generate a minimal force sufficient for the longitudinal displacement of the piston 31 in the outer body 21. Thus, the displacement of the piston 31 to the third position occurs only during very low pressure drop in the flow restriction member 35, and, therefore, the valve 18 closure takes place at near zero fluid flow rates, practically eliminating the pressure surge.

It is to be understood that valve 18 may be used to close tool 16, a drill string, or other tubular. Without limitation, valve 18 allows high circulation flow rates during deployment of tools 16, drill strings, or other tubulars in wellbore 10 and closure of valve 18 at near zero flow rates, which practically eliminates pressure surge.

Although the present invention and its advantages have been described in detail, it should be understood that various changes, substitutions and alterations may be made herein without departing from the spirit and scope of the invention as defined by the appended claims.

What is claimed is:

1. A flow activated valve, comprising:
   an outer body;
   a piston disposed in an inner cavity of the outer body;
   one or more fluid passage exits in the outer body and one or more piston fluid passages in the piston, wherein the one or more fluid passage exits and the one or more piston fluid passages allow fluid flow out of the valve;
   a flow restriction member disposed in a piston inner cavity;
   a shear member disposed in the outer body;
   a bias member disposed in an inner cavity of the outer body;
   a position control member adapted to lock the piston in a position preventing longitudinal movement of the piston in the outer body; and
   a sealing member.

2. The valve of claim 1, wherein the shear member releases the piston at a certain force.

3. The valve of claim 1, wherein the bias member is adapted to bias the piston in an upward position.

4. The valve of claim 1, wherein the sealing member is positioned between the one or more fluid passage exits and the one or more piston fluid passages.

5. The valve of claim 1, wherein the piston is slidable in the inner cavity formed inside the outer body.

6. The valve of claim 1, further comprising an upper portion, wherein the upper portion comprises an end having threads to mate with a tool.

7. The valve of claim 1, wherein the lower portion comprises a flange with a flange fluid passage.

8. The valve of claim 7, wherein the flange fluid passage allows fluid flow in and out of the inner cavity.

9. The valve of claim 1, wherein the one or more fluid passage exits allow fluid to flow out of the outer body.

10. The valve of claim 1, wherein the shear member controls longitudinal positioning of the piston relative to the outer body.

11. The valve of claim 1, wherein the shear member is engaged in a groove.

12. The valve of claim 1, wherein an end of the bias member engages the piston, and wherein another end of the bias member engages the outer body.

13. The valve of claim 1, wherein the sealing member is disposed in a groove located adjacent to the one or more piston fluid passages.

* * * * *